UNITED STATES PATENT OFFICE.

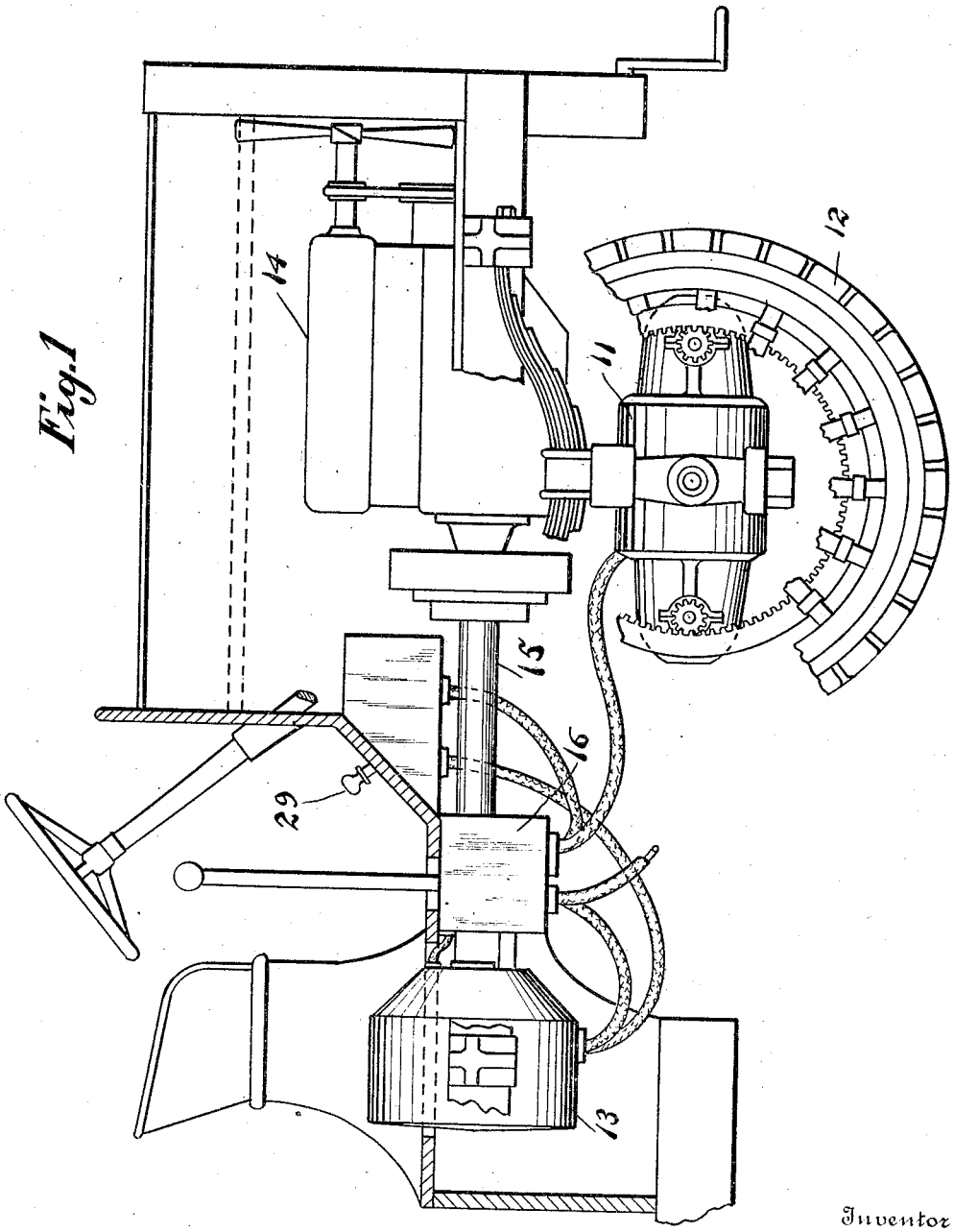

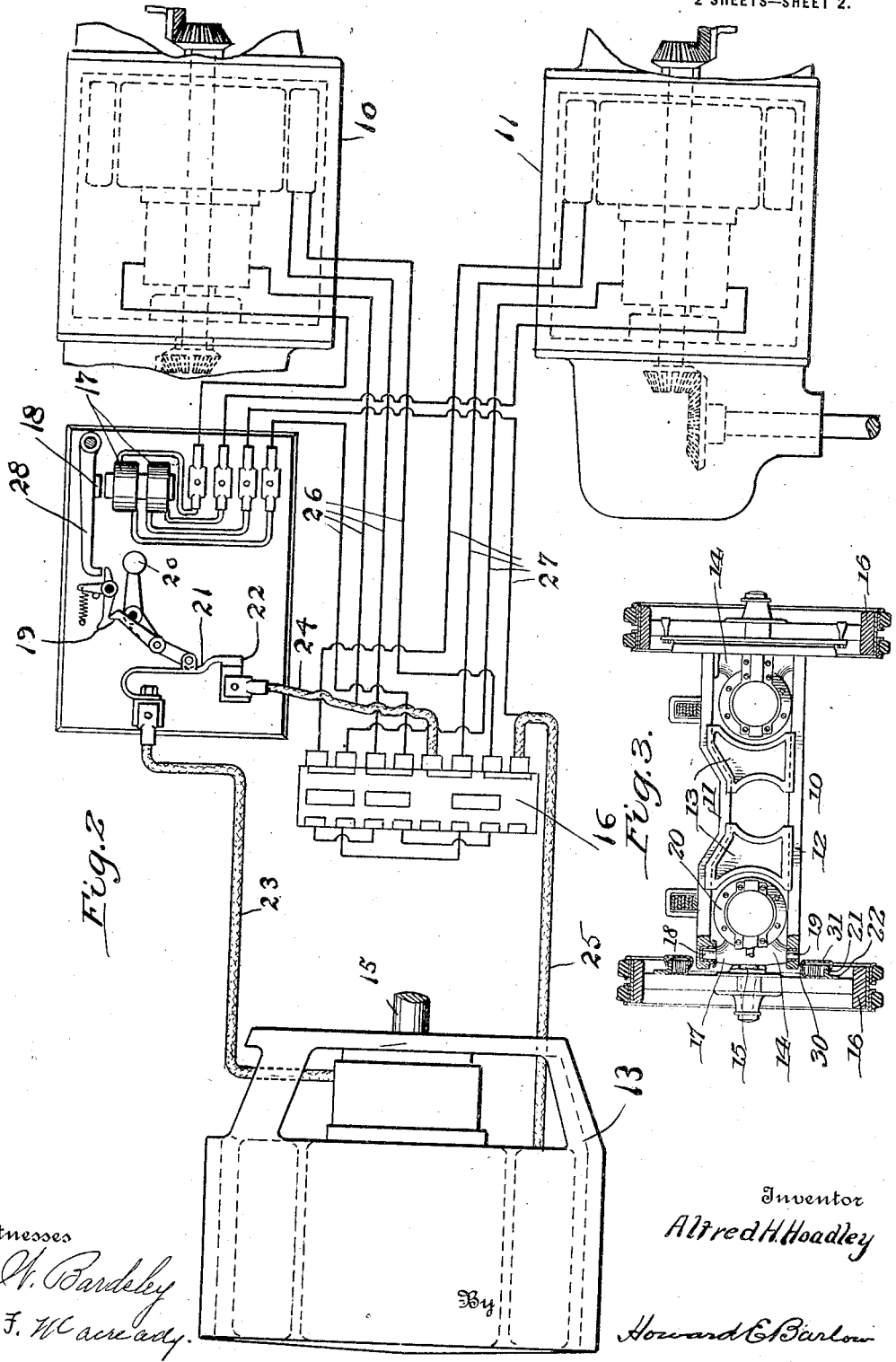

ALFRED H. HOADLEY, OF PROVIDENCE, RHODE ISLAND.

TRACTOR SYSTEM FOR MOTOR-VEHICLES.

1,137,620.   Specification of Letters Patent.   Patented Apr. 27, 1915.

Application filed June 11, 1914.   Serial No. 844,555.

*To all whom it may concern:*

Be it known that I, ALFRED H. HOADLEY, citizen of the United States, and resident of city of Providence, in the county of Providence and State of Rhode Island, have invented certain new and useful Improvements in Tractor Systems for Motor-Vehicles, of which the following is a specification.

This invention relates to an automatic control system for connecting together two electric motors to work in unison, and the object of this invention is to provide means whereby the current is broken to both motors when one becomes inoperative or the current to one becomes greater than that to the other.

It is found in the practical operation of tractor systems of the character described in my prior Patent No. 1080447 very desirable, if not necessary for safety in handling the apparatus, to provide means whereby if one of the driving electric motors becomes disabled the motor on the opposite wheel will simultaneously become inoperative, for the reason that by the usual wiring system when the current is cut out of one motor the other receives the voltage practically of both and imparts to the same such increased energy that it immediately jumps ahead and the steering wheel is apt to be wrenched from the hand of the driver and serious accident result, therefore to obviate this difficulty I interpose a current breaker into the electric circuit between the two motors, which is adapted to be operated by an unbalancing of the current to the different motors, to instantly and automatically break the main circuit and cut off the current to both motors. By this arrangement the danger above described is removed and the operator may then cut down the speed of his generator and restore a light current to the one remaining motor.

Figure 1 is a sectional side elevation showing the general arrangement of mechanism to which my improved automatic control system is applied to a tractor mechanism. Fig. 2 is a diagrammatic view showing the general wiring diagram and circuit connections, between the generator and two motors with the circuit breaking device interposed between the generator and the motors.

My improved automatic system may be applied to any power plant, whereby two or more electric motors are connected together to work in unison and whereby the discontinuance of the action of one motor adversely affects the action of the other, but I have devised this system to be applied more particularly to remedy a possible defect in the safe operation of my improved tractor mechanism described in the patent above referred to. In the construction of this tractor mechanism the electric motors 10 and 11 are operatively mounted on the opposite traction wheels 12. The generator 13 is driven by any suitable means for generating a current for these driving motors, but in the present instance I have shown this generator as being driven by an internal combustion engine 14 through the main shaft 15. The current from the generator was originally passed through the circuit wires 23 and 25, and controller 16 to the motors 10 and 11 by any of the usual systems of wires 26 and 27 the same being so arranged that if for any reason one of the motors was disabled the whole force of the current originally distributed to both motors would then pass into the one still in operation, this excess of current would immediately jump the motor ahead and cause the tractor wheel on which it was mounted to turn quickly out of its normal path of travel, and in some cases render the apparatus unmanageable. To obviate this source of difficulty which in some instances might prove serious I have interposed into the circuit between the generator and the motors, a circuit breaker of any suitable construction, which may be in the form of a fuse, cut-out or other suitable device for automatically breaking the circuit when the current to one motor becomes greater than that to the other motor.

In the drawings I have herein illustrated one form of circuit breaker which is that of a pair of magnets 17 wound to oppose each other, each being connected to the circuit of the opposite motors, whereby when the current to one motor is reduced beyond the predetermined point, the current through these two opposing electromagnets fails to balance or neutralize each other and the armature 18 is attracted and drawn downward and through the movement of the lever 28 trips the latch 19 and permits the weight 20 to fall and the connecting member 21 by its inherent spring rises and breaks the circuit through the main wire 23 at the point 22. Thus it will be seen that the current is automatically shut-off of both motors by the unbalancing of the current passing to them. By this construction the driver realizing that something has gone wrong with the driving mechanism, simply applies his brakes and stops the car. After examination he finds that one of his motors has gone wrong, and that the circuit breaker has been tripped, he then resets his controller by the pressure of the foot upon the lever 29, see Fig. 2, which restores the controller to normal position. The driver may then start his generator slowly into action and by the use of the remaining motor drive his vehicle to a garage for inspection and repairs.

I claim:

1. In a tractor system a pair of motors each mounted to operate separate steerable traction wheels, said motors being connected to work in unison, and means for breaking the current to both motors when one becomes inoperative, whereby an excessive driving force is effectually prevented from being applied to one of said wheels to throw it from its normal line of travel.

2. In a tractor system a pair of motors each mounted to operate separate steerable traction wheels independently and means interposed into the electric circuit adapted to be operated by an unbalancing of the current to the different motors to automatically affect the main current and prevent an excessive driving force being applied to one of said wheels to throw it from its normal line of travel.

3. A motor vehicle comprising traction wheels pivotally journaled upon opposite ends of a relatively stationary axle, an electric generator carried by the vehicle for supplying current with which to drive said motors and means whereby the current is broken to both motors when the current to said motors becomes unequal, whereby an excessive driving force is effectually prevented from being applied to one of said wheels to turn the vehicle from its normal line of travel.

4. A motor vehicle comprising traction wheels pivotally journaled upon opposite ends of a relatively stationary axle, a source of electric energy carried by the vehicle for supplying current with which to drive said motors and means whereby the current is rendered ineffective upon both motors when the current to both becomes unequal, whereby a double driving force is prevented from being thrown on one of the steerable traction wheels to turn the vehicle from its normal line of travel.

In testimony whereof I affix my signature in presence of two witnesses.

ALFRED H. HOADLEY.

Witnesses:
Wm. E. White,
Jas. T. Rathbun.